US008257597B1

(12) United States Patent
Guan et al.

(10) Patent No.: US 8,257,597 B1
(45) Date of Patent: Sep. 4, 2012

(54) DOUBLE RIE DAMASCENE PROCESS FOR NOSE LENGTH CONTROL

(75) Inventors: Lijie Guan, San Jose, CA (US); Changqing Shi, San Ramon, CA (US); Ming Jiang, San Jose, CA (US); Yun-Fei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 259 days.

(21) Appl. No.: 12/717,090

(22) Filed: Mar. 3, 2010

(51) Int. Cl.
*B44C 1/22* (2006.01)

(52) U.S. Cl. ........... 216/22; 216/41; 216/58; 216/83; 438/689; 438/712; 438/745; 29/603.01; 29/603.16

(58) Field of Classification Search .......... 216/22, 216/41, 58, 83; 29/603.01, 603.16; 438/689, 438/712, 745
See application file for complete search history.

(56) References Cited

U.S. PATENT DOCUMENTS

| | | | |
|---|---|---|---|
| 4,226,665 A | 10/1980 | Mogab | |
| 4,505,025 A | 3/1985 | Kurosawa et al. | |
| 4,538,343 A | 9/1985 | Pollack et al. | |
| 4,582,565 A | 4/1986 | Kawakatsu | |
| 4,584,761 A | 4/1986 | Wu | |
| 6,124,212 A | 9/2000 | Fan et al. | |
| 6,255,040 B1 | 7/2001 | Sasaki | |
| 6,399,507 B1 | 6/2002 | Nallan et al. | |
| 6,497,825 B1 | 12/2002 | Kamijima | |
| 6,798,616 B1 * | 9/2004 | Seagle et al. | 360/125.65 |
| 7,133,253 B1 | 11/2006 | Seagle et al. | |
| 7,275,306 B2 * | 10/2007 | Allen et al. | 29/603.16 |
| 7,911,735 B1 * | 3/2011 | Sin et al. | 360/119.02 |
| 8,141,235 B1 * | 3/2012 | Zhang | 29/603.16 |
| 2005/0271951 A1 | 12/2005 | Kim | |
| 2006/0039081 A1 * | 2/2006 | Lille | 360/123 |
| 2007/0236830 A1 | 10/2007 | Matono | |
| 2007/0279802 A1 | 12/2007 | Sasaki et al. | |
| 2008/0276448 A1 | 11/2008 | Pentek | |
| 2008/0316644 A1 | 12/2008 | Lee et al. | |
| 2009/0091861 A1 * | 4/2009 | Takano et al. | 360/319 |

* cited by examiner

*Primary Examiner* — Shamim Ahmed

(57) ABSTRACT

Methods of forming a write pole are disclosed. A first photomask having a first opening over one of a yoke region and a pole tip region of the write pole is formed over an insulation layer having an insulator material. A first etch process is performed on the insulation layer via the first opening, the first etch process removing the insulator material from a corresponding one of the yoke region and the pole tip region. A second photomask having a second opening over the other one of the yoke region and the pole tip region is formed over the insulation layer. A second etch process is performed on the insulation layer via the second opening, the second etch process removing the insulator material from a corresponding one of the yoke region and the pole tip region.

15 Claims, 6 Drawing Sheets

DOUBLE RIE DAMASCENE PROCESS FOR NOSE LENGTH CONTROL

FIELD OF THE INVENTION

The present invention generally relates to fabrication of a magnetic write pole and, in particular, relates to a double damascene process for nose length control.

BACKGROUND OF THE INVENTION

Damascene processes may be used to "build up" structures for use in a hard drive head, such as a write pole, as opposed to methods which rely upon material removal to form such 3D structures. As applied to formation of perpendicular magnetic recording (PMR) write poles, an example of which is shown in FIG. 1, the damascene process involves forming grooves or trenches in a material (e.g., $Al_2O_3$), and then depositing (e.g., electroplating) a pole material into the trenches to form write poles.

With reference to FIG. 1, convention processes used in fabrication of a PMR write pole 110 utilize a single photo/trimming process that defines two critical parameters, namely, track width (TW) 102 and nose length (NL) 104 of the write pole 110. The NL 104 is a length that a pole tip section 114 of the write pole 100 extends from an end 108 of a yoke region 112 after the nose section 114 is trimmed (e.g., by a lapping operating) to an air bearing surface (ABS) 116 of the write pole 110. The TW 102 is a width of the pole tip section 114 after the trimming. The single photo/trimming process creates a rounding of a transition region 106 where the yoke and pole tip regions 112, 114 are adjoined. A measure of the rounding is a radius of curvature (R) 104 of the transition region 106. Due to the rounding effect, it is hard to achieve a precise control of the TW 102 when a short NL 104 is required.

FIG. 2 illustrates a prior art PMR main write pole fabrication method. Although the prior art fabrication method utilizes two separate reactive ion etching (RIE) steps, transition region 206 is nevertheless defined at the first RIE etching step (left insert), and a significant rounding (e.g., R in excess of 0.4 micrometers) results from the photo and trimming processes. As a result, with such prior art fabrication methods, a short NL is coupled with a large chisel angle at ABS, and a large TW sigma ensues. Conversely, the TW sigma requirement puts a constraint on how short the NL can be.

SUMMARY OF THE INVENTION

Various embodiments of the subject disclosure solve the foregoing problems by providing PMR write pole fabrication methods in which corresponding areas of the yoke and pole tip regions in the transition region of the write pole are defined at two different etching steps. At each etching step, one of the corresponding areas of the yoke and pole tip regions is precisely etched. By optimizing the photo/RIE process for each of the etching steps, the rounding of the transition region can be minimized and a very short NL (e.g., <50 nm) can be achieved without the penalty of a large TW sigma.

According to one aspect of the subject disclosure, a method of forming a write pole for a magnetic recording head is provided. The method can comprise providing a wafer comprising an insulation layer, the insulation layer having an insulator material. The method can further comprise forming a first photomask over the insulation layer, the first photomask providing a first opening over one of at least a yoke region and at least a pole tip region of the write pole to be formed. The method can further comprise performing a first etch process on the insulation layer via the first opening, the first etch process removing the insulator material from a corresponding one of at least the yoke region and at least the pole tip region. The method can further comprise forming a second photomask over the insulation layer, the second photomask providing a second opening over the other one of at least the yoke region and at least the pole tip region of the write pole to be formed. The method can further comprise performing a second etch process on the insulation layer via the second opening, the second etch process removing the insulator material from a corresponding one of at least part of the yoke region and at least part of the pole tip region. The method can further comprise depositing a pole material across the wafer, whereby the yoke region and the pole tip region of the write pole are formed, the pole tip region adjoining the yoke region.

According to another aspect of the subject disclosure, a method of forming a write pole for a magnetic recording head is provided. The method can comprise providing a wafer comprising an insulation layer. The method can further comprise forming a first photomask over a portion of the insulation layer. The method can further comprise forming a first trench in the insulation layer via the first photomask. The method can further comprise depositing a sacrificial material in the first trench. The method can further comprise planarizing the sacrificial material. The method can further comprise forming a second photomask over a portion of the insulation layer and a portion of the planarized sacrificial material. The method can further comprise forming a second trench in the insulation layer via the second photomask. The method can further comprise depositing a pole material across the wafer, whereby the first and second trenches are filled with the pole material to form the write pole, wherein a transition region of the write pole where a yoke region and a pole tip region are adjoined has a radius of curvature less than about 0.2 micrometers.

According to another aspect of the subject disclosure, a write pole for a magnetic recording head is provided. The write pole can comprise a pole tip region. The write pole can further comprise a yoke region adjoining the pole tip region, wherein a transition region where the yoke region and pole tip region are adjoined is formed in two separate etching operations, and wherein the transition region has a radius of curvature less than about 0.2 micrometers.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 3A:
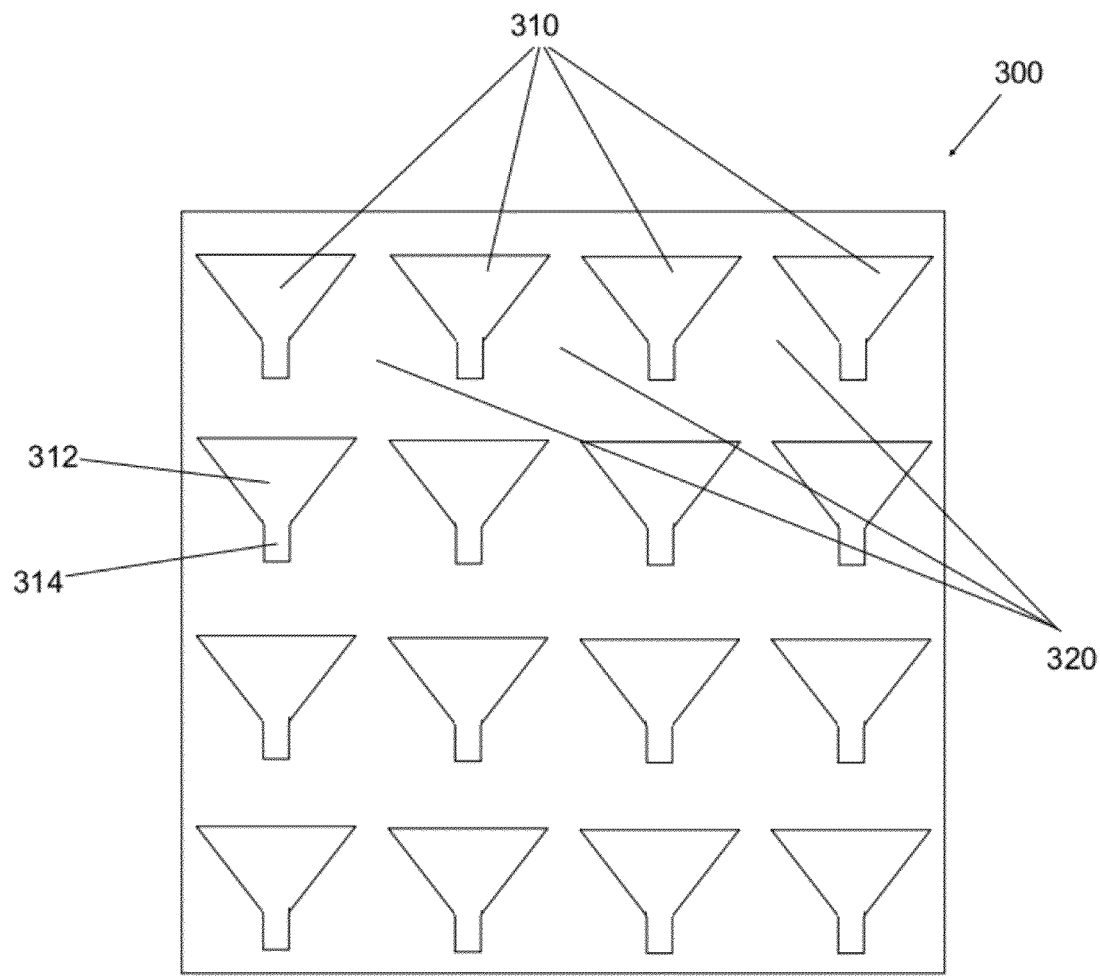
FIG. 3A is a top view of a wafer comprising a plurality of exemplary damascene trenches formed in one or more layers of materials before a pole material is deposited thereon.
Figure 3B:
FIG. 3B is a side view of the wafer shown in FIG. 3A.

A multitude of PMR write poles may be simultaneously produced via a wafer fabrication process. FIG. 3A is a top view of a wafer 300 comprising a plurality of damascene trenches 310 formed in one or more layers of materials before a pole material is deposited thereon. FIG. 3B is a side view of the wafer 300 and shows an RIE stop layer 330 and an insulation layer 340 comprising an insulator material (e.g., $Al_2O_3$) formed over the RIE stop layer 330. Exemplary methods by which the damascene trenches 310 may be fabricated in the wafer 300 will be provided below with respect to FIGS. 4, 5, and 6.

After the trenches 310 are formed, the wafer 300, viewed from the top, comprises the damascene trenches 310 and remaining field areas 320. Each of the trenches 310 comprises a yoke region 312 and a relatively narrow pole tip region 314. A pole material (not shown) is then deposited onto the wafer 300 to fill trenches 310.

Figure 3B:
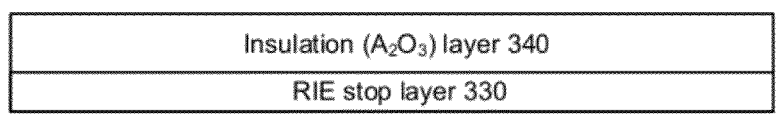
Figure 4:
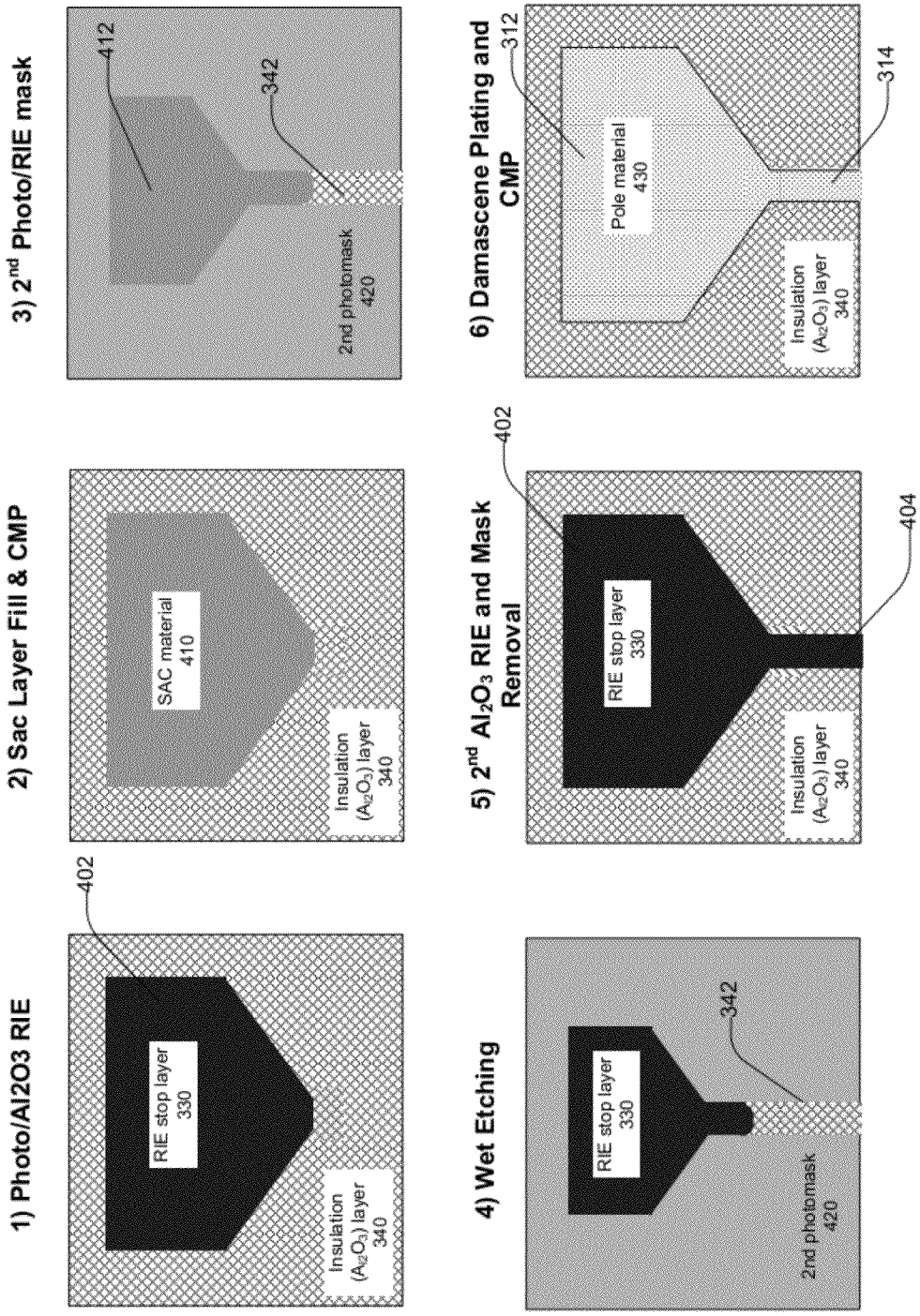
FIG. 4 illustrates an exemplary PMR write pole fabrication methodology according to certain embodiments of the subject disclosure.
Figure 5:
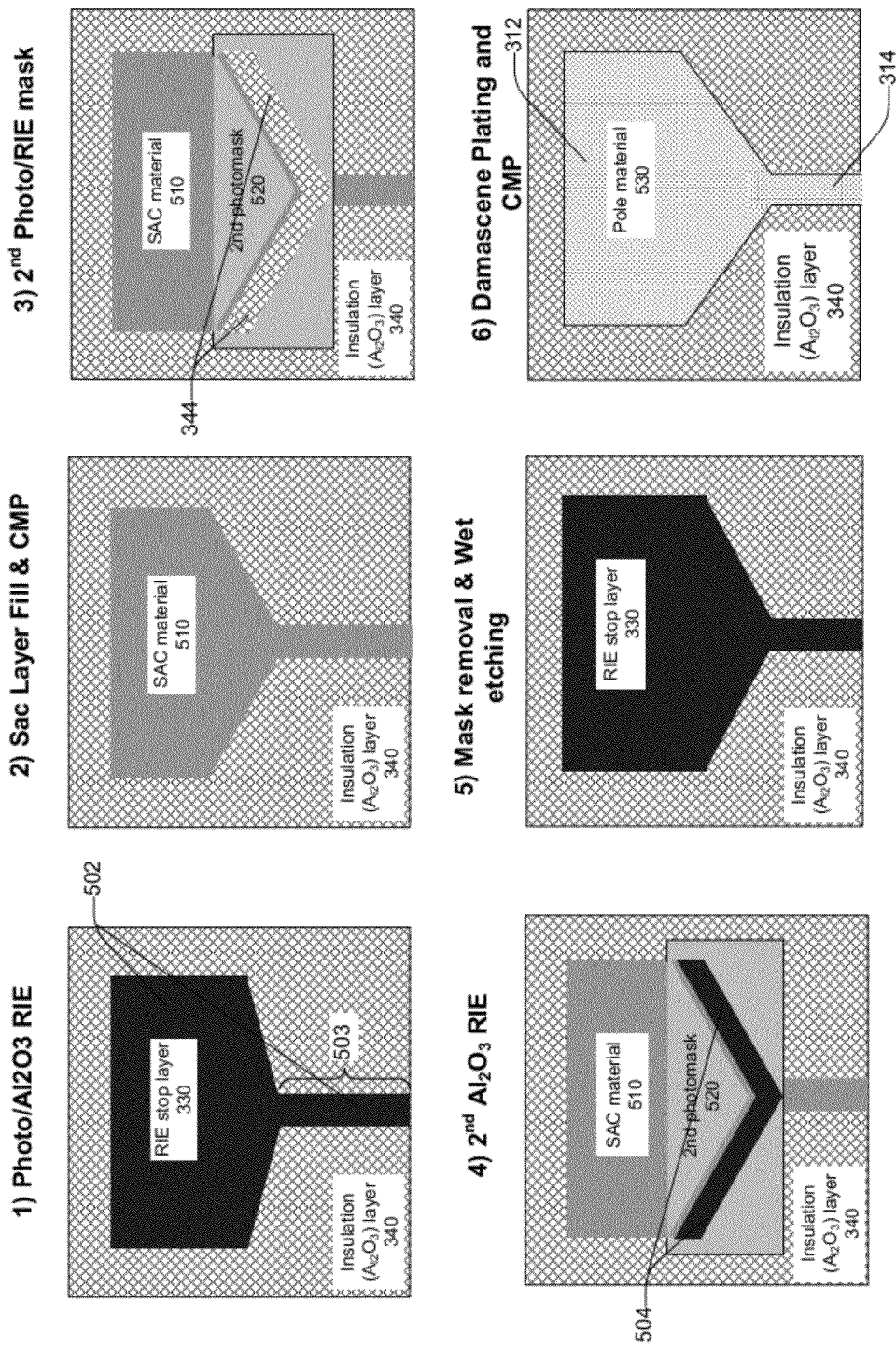
FIG. 5 illustrates an exemplary PMR write pole fabrication methodology according to other embodiments of the subject disclosure.

FIGS. 4 and 5 illustrate exemplary PMR pole fabrication methodologies according to different embodiments of the subject disclosure. Each of FIGS. 4 and 5 includes a series of inserts or subfigures 1-6 representing intermediate structures resulting from different processing steps of the corresponding exemplary PMR pole fabrication methodology of the subject disclosure. It shall be appreciated that, for the sake of simplicity, FIGS. 4 and 5 focus on the fabrication of one PMR write pole among the plurality of PMR write poles being formed on the wafer 300 of FIG. 3. As such, a reference to one element of the structures shown in FIGS. 4 and 5 related to one PMR write pole shall be understood as being applied to the same element in all PMR write poles being formed on the wafer 300.

Certain embodiments of the PMR pole fabrication methodology of the subject disclosure are now described with reference to FIG. 4. As illustrated by subfigure 1 of FIG. 4, a first damascene trench 402 is formed in the insulation layer 340 of the wafer 300. Formation of the first damascene trench 402 can comprise forming a first photomask having a first opening with a shape of the first damascene trench 402 over the insulation layer 340, followed by a first RIE process in which an insulator material (e.g., $Al_2O_3$) of the insulation layer 340 disposed below the first opening is removed, e.g., down to the RIE stop layer 330. In the illustrated example of FIG. 4, the first damascene trench 402 corresponds to or defines the yoke region 312 of the write pole to be formed.

As illustrated by subfigure 2 of FIG. 4, a sacrificial (SAC) material 410 is deposited across the wafer 300 to fill the first damascene trench 402. In some embodiments, the sacrificial material 410 is a metal such as Cu, Ru, and NiFe. In other embodiments, the sacrificial material 410 is a metal oxide such as $SiO_2$ and $TaO_2$. Subsequently, the sacrificial material 410 is planarized, e.g., by a chemical mechanical planarization (CMP) process, to form a substantially even surface across the wafer 300.

As illustrated by subfigure 3 of FIG. 4, a second photomask 420 is formed over a portion of the insulation layer 340 and a portion of the SAC material 410. The second photomask 420 provides a second opening over an exposed portion 412 of the SAC material 410 and an exposed portion 342 of the insulation layer 340.

As illustrated by subfigure 4 of FIG. 4, the exposed portion 412 of the SAC material 410 below the second opening of the second photomask 420 is removed, e.g., by a wet etching process involving a wet etchant. In case the SAC material 410 is a metal (e.g., Cu, Ru, or NiFe), a chemical such as $HNO_3$ or HCL (for Cu and NiFe) and NaOCl (for Ru) can be used as the wet etchant. In case the SAC material 410 is a metal oxide (e.g., $SiO_2$ or $TaO_2$), a chemical such as BHF can be used as the wet etchant. In some embodiments, the wet etching can also remove all or part of the exposed portion 342 of the insulation layer 340.

As illustrated by subfigure 5 of FIG. 4, the exposed portion 342 of the insulation layer 340 below the second opening of the second photomask 420 is removed by a second RIE process to form a second damascene trench 404 that adjoins the first damascene trench 402 in a transition region. In the illustrated example, the second damascene trench 404 corresponds to or defines the pole tip region 314 of the write pole to be formed. In this sense, the second photomask 420 serves dual functions as a mask during the wet etching of the SAC material 410 described above with respect to subfigure 4, as well as during the second RIE process presently described. Subsequently, the second photomask 420 is removed, e.g., by a photostripping process or a dry etching process.

As illustrated by subfigure 6 of FIG. 4, a pole material 430 is deposited (e.g., electroplated) in the first and second trenches 402, 404 to form the yoke region 312 and the pole tip region 314 of the write pole, respectively. In some embodiments, the pole material 470 are cobalt nickel iron (CoNiFe). In other embodiments, the pole material 470 may be other combination of cobalt (Co), nickel (Ni), and/or iron (Fe), such as CoFe or NiFe.

Other embodiments of the PMR pole fabrication methodology of the subject disclosure are now described with reference to FIG. 5. As illustrated by subfigure 1 of FIG. 5, a first damascene trench 502 is formed in the insulation layer 340 of the wafer 300. In certain embodiments, formation of the first damascene trench 502 comprises forming a first photomask having a first opening with a shape of the first damascene trench 502 over the insulation layer 340, followed by a first RIE process in which an insulator material (e.g., $Al_2O_3$) of the insulation layer 340 below the first opening of the first photomask is removed down to the RIE stop layer 330. In the illustrated example of FIG. 5, the first damascene trench 502 comprises an elongated rectangular portion 503 having a width that defines a track width (TW) of a write pole to be formed.

As illustrated by subfigure 2 of FIG. 5, a sacrificial (SAC) material 510 is deposited in the first damascene trench 502. In some embodiments, the sacrificial material 510 is a metal such as Cu, Ru, and NiFe. In other embodiments, the sacrificial material 510 is a metal oxide such as $SiO_2$ and $TaO_2$. Subsequently, the sacrificial material 510 is planarized (e.g., by a CMP operation) to form a substantially even surface across the wafer 300.

As illustrated by subfigure 3 of FIG. 5, a second photomask 520 is formed over a portion of the insulation layer 340 and a portion of the SAC material 510. The second photomask 420 provides a second opening over an exposed portion 344 of the insulation layer 340. In certain embodiments, the second opening may also expose a portion of the SAC material 510 as shown in the subfigure 3.

As illustrated by subfigure 4 of FIG. 5, the exposed portion 344 of the insulation layer 340 below the second opening of the second photomask 520 is removed by a second RIE process to form a second damascene trench 504. In the illustrated example, the second damascene trench 504 corresponds to a lower portion of the yoke region 312 and provides a sharp angle (e.g., R<0.2 micrometers) between the yoke region 312 and the pole tip region 314.

As illustrated by subfigure 5 of FIG. 5, the second photomask 520 is removed, and, subsequently or concurrently, the sacrificial material 510 is also removed, e.g., by one or more wet etching processes as described above with respect to FIG. 4.

As illustrated by subfigure 6 of FIG. 5, a pole material 530 is deposited (e.g., electroplated) in the first and second trenches 502, 504 to form the yoke region 312 and the pole tip region 314 of the write pole.

Figure 6:
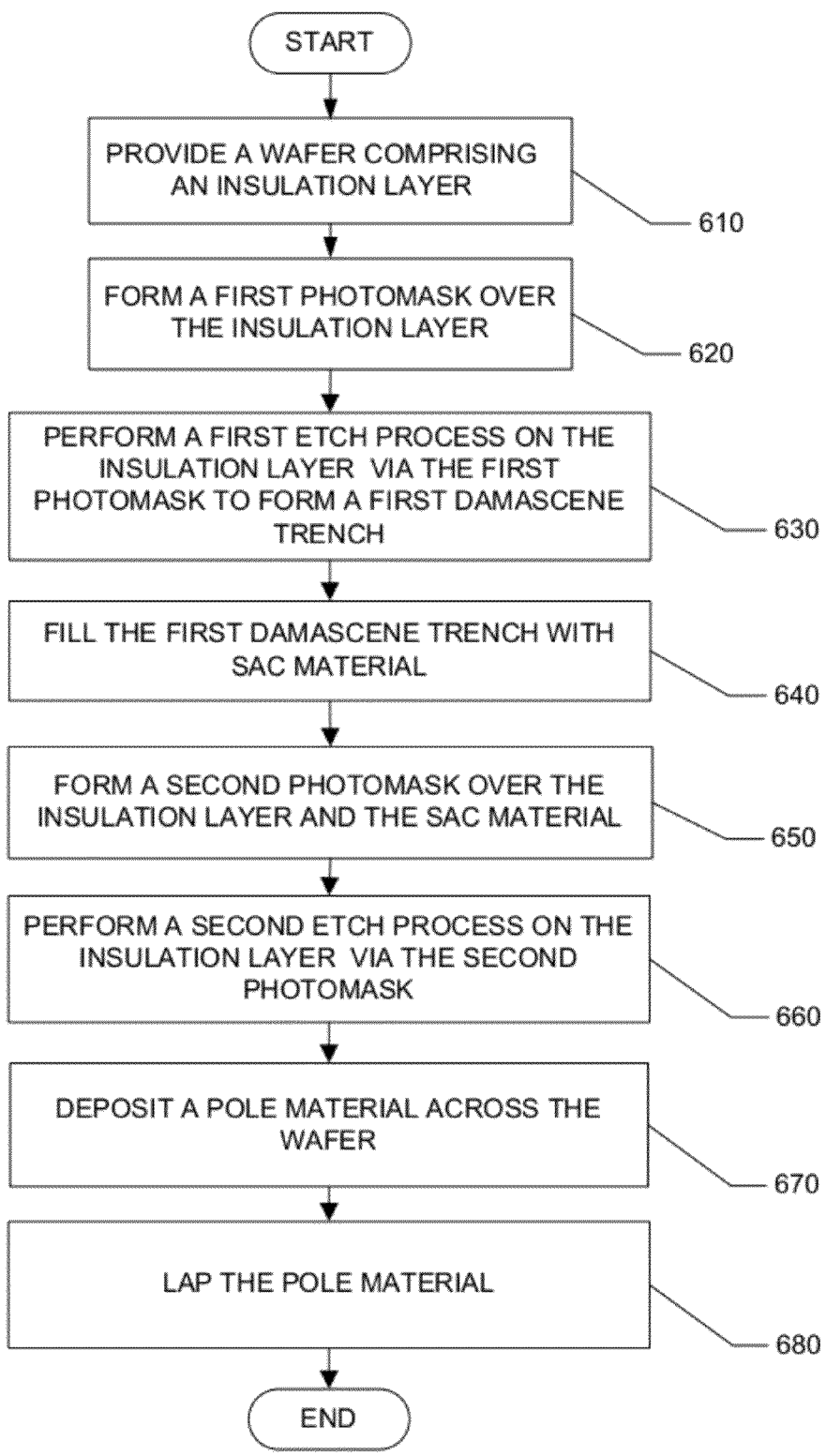
FIG. 6 is a flowchart illustrating an exemplary process for fabricating a PMR write pole according to certain embodiments of the subject disclosure.

FIG. 6 is a flowchart illustrating an exemplary process 600 for fabricating a PMR write pole according to certain aspects of the subject disclosure. For clarity and ease of illustration, without any intent to limit the scope of the subject disclosure in any way, the process 600 will be described with reference to FIGS. 3, 4 and 5 described above. The process 600 begins at operation 610, in which a wafer 300 comprising an RIE stop layer 330 and an insulation layer 340 over the RIE stop layer 330 is provided. The insulation layer 340 comprises an insulator material such as $Al_2O_3$. The process 600 proceeds to operation 620, in which a first photomask is provided over the insulation layer 340. The first photomask provides a first opening over or exposes one of at least a yoke region 312 and at least a pole tip region 314 of the write pole to be formed. In the illustrated example of FIG. 4, the first opening exposes the yoke region 312. In the illustrated example of FIG. 5, the first opening exposes the pole tip region 314 and at least a portion of the yoke region 312.

The process 600 proceeds to operation 630, in which a first etch process is performed on the insulation layer 340 via the first opening to form a first damascene trench (402, 502) in the insulation layer 340. The first etch process removes the insulator material from a corresponding one of at least the yoke region 312 and at least the pole tip region 314. In the illustrated example of FIG. 4, the insulating material in the yoke region 312 is removed. In the illustrated example of FIG. 5, the insulating material in the pole tip region 314 and at least a portion of the yoke region 312 is removed. The first etch process produces a first sidewall angle in the first damascene trench, where the first sidewall angle can be in the range of between about 90 to 100 degrees as measured from the bottom of the first damascene trench (e.g., the top of the RIE stop layer 330). In the illustrated example of FIG. 4, the yoke region 312 can be made to have a 90-degree sidewall angle with respect to the RIE stop layer 330, for example.

The process 600 proceeds to operation 640, in which the first damascene trench 402, 502 thus formed is filled with a sacrificial material 410, 510. The sacrificial material 410, 510 can be a metal such as Cu, Ru, and NiFe, or a metal oxide such as $SiO_2$ and $TaO_2$. Subsequently, the sacrificial material 410, 510 is planarized to form a substantially even surface across the wafer 300. The planarization process can include, for example, a chemical mechanical planarization (CMP) operation.

The process 600 proceeds to operation 650, in which a second photomask 420, 520 is formed over the insulation layer 340. The second photomask 420, 520 provides a second opening over the other one of at least the yoke region 312 and at least the pole tip region 314 of the write pole to be formed. In the illustrated example of FIG. 4, the second opening exposes a portion 342 of the insulation layer 340 that corresponds to the pole tip region 314 of the write pole. The second opening also exposes an interior portion 412 of the sacrificial material 410. In the illustrated example of FIG. 5, the second opening exposes a chevron-shaped portion 344 of the insulation layer 340 that corresponds to a lower edge portion of the yoke region 312.

The process 600 proceeds to operation 660, in which a second etch process is performed on the insulation layer 340 via the second opening to form a second damascene trench (404, 504) in the insulation layer 340. The second etch process removes the insulator material from portion 342, 344 of the insulation layer 340 exposed by the second opening of the second photomask 420, 520. In the illustrated example of FIG. 4, the insulating material in the pole tip region 314 is removed by the second RIE process. The second etch process produces a second sidewall angle in the second damascene trench, where the second sidewall angle can be in the range of between about 90 to 120 degrees as measured from the bottom of the second damascene trench (e.g., the top of the RIE stop layer 330). The use of two separate etch processes that independently form the yoke and pole tip regions allows for an independent control of sidewall angles in those regions. For example, in the illustrated example of FIG. 4, the pole tip region 314 can be made to have a 120-degree sidewall angle both with respect to the bottom the RIE stop layer 330, thereby forming a pole tip region 314 having a trapezoidal cross-section to minimize a skew effect, while the yoke region 312 can be made to have a 90-degree sidewall angle by the first etch process to maximize the amount of magnetic material in the yoke region 312.

The process 600 proceeds to operation 670, in which a pole material 430, 530 is deposited across the wafer, whereby the yoke region 312 and the pole tip region 314 adjoining the yoke region 312 are thereby formed.

Figure 1:
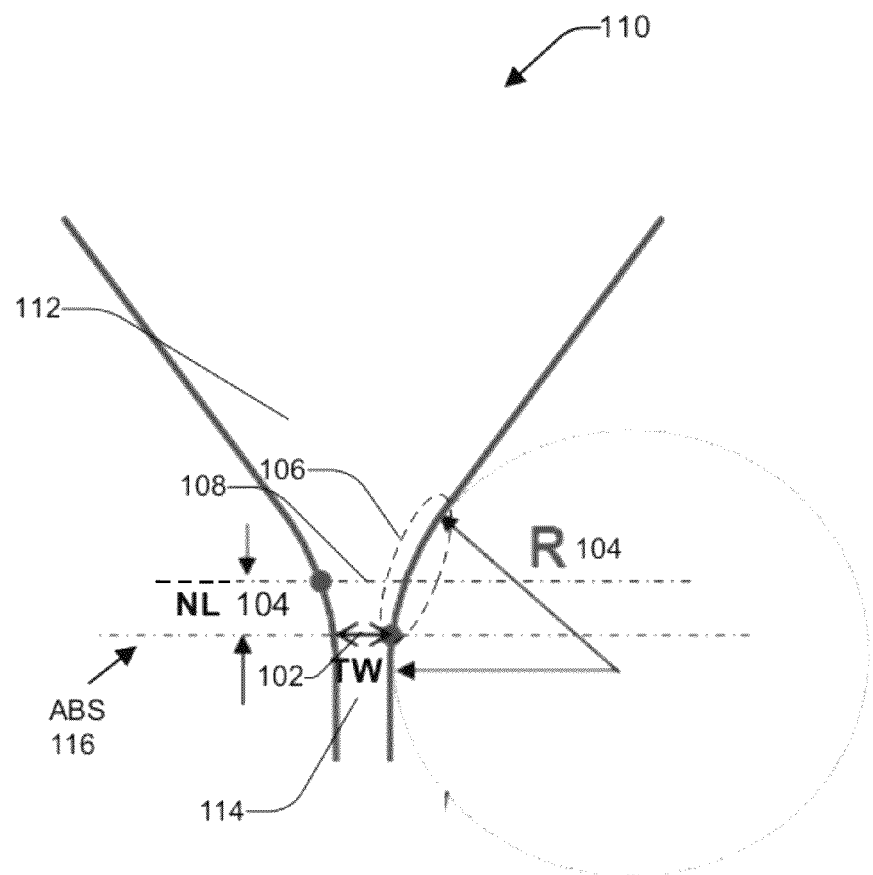
FIG. 1 is a top view of an exemplary write pole.
Figure 2:
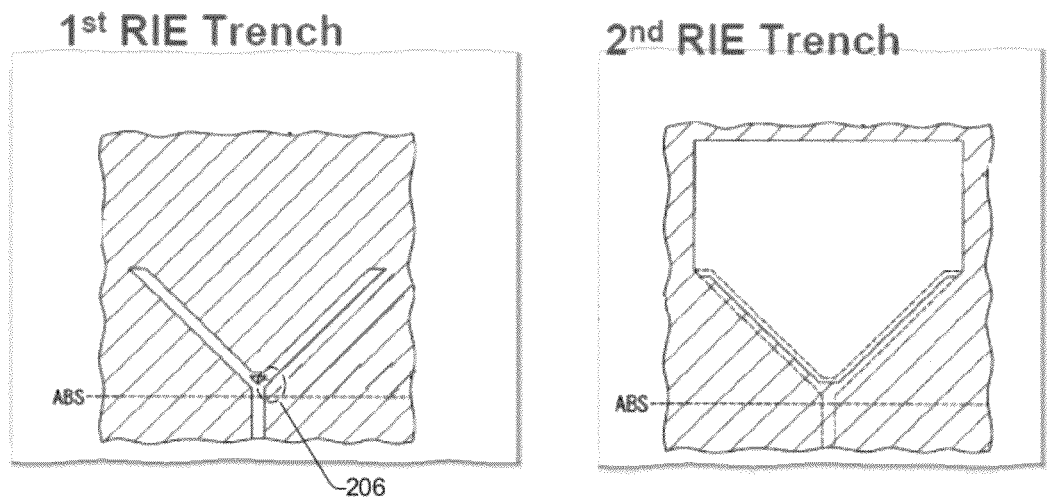
FIG. 2 illustrates a prior art PMR main write pole fabrication method.

The process 600 proceeds to operation 680, in which the pole material in the pole trip region 312 and the surrounding insulator material of the insulation layer 340 are removed, e.g., by a lapping operation up to the ABS 116 (FIG. 1) of the write pole.

Various embodiments of the PMR write pole fabrication methods described herein, minimizes the rounding of the transition region of the write pole by forming portions of the pole tip and the yoke regions in the transition region in two separate photo/etch processes. By optimizing each photo/etch processes for each of the pole tip portion and the yoke portion being formed, the resulting transition region can attain a radius of curvature (R) of less than 0.2 micrometers, which is less than half of what can be typically achieved by a conventional PMR write pole fabrication method. In some embodiments, R of between about 0 and 0.05 micrometer can be achieved. In other embodiments, R of between about 0.05 and 0.1 micrometer can be achieved. In yet other embodiments, R of between about 0.1 and 0.2 micrometer can be achieved. By minimizing the rounding, various embodiments described herein can achieve a shorter NL for the write pole without incurring the penalty of a large TW sigma. For example, in some embodiments, a NL of between about 20 and 70 nm can be achieved while holding the TW sigma within 2 nm.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a write pole for a magnetic recording head, the method comprising:
    providing a wafer comprising an insulation layer, the insulation layer having an insulator material;
    forming a first photomask over the insulation layer, the first photomask providing a first opening over one of at least a yoke region and at least a pole tip region of the write pole to be formed;
    performing a first etch process on the insulation layer via the first opening, the first etch process removing the insulator material from a corresponding one of at least the yoke region and at least the pole tip region;
    forming a second photomask over the insulation layer, the second photomask providing a second opening over a different one of at least the yoke region and at least the pole tip region of the write pole to be formed than the first opening;
    performing a second etch process on the insulation layer via the second opening, the second etch process removing the insulator material from a corresponding one of at least part of the yoke region and at least part of the pole tip region; and
    depositing a pole material across the wafer, whereby the yoke region and the pole tip region of the write pole are formed, the pole tip region adjoining the yoke region.

2. The method of claim 1, wherein the insulator material comprises an aluminum oxide.

3. The method of claim 2, wherein the first and second etch processes comprise reactive ion etching of the aluminum oxide.

4. The method of claim 1, wherein the first etch process produces a first sidewall angle in a corresponding one of at least part of the yoke region and at least part of the pole tip region, and the second etch process produces a second sidewall angle in the other one of at least the yoke region and at least the pole tip region, the first sidewall angle being different from the second sidewall angle.

5. The method of claim 1, wherein the second opening comprises an elongated rectangular portion having a width that defines a track width of the write pole.

6. The method of claim 1, wherein a transition region of the write pole where the yoke and pole tip regions are adjoined has a radius of curvature less than about 0.2 micrometers.

7. The method of claim 1 further comprising depositing a sacrificial material to fill a trench in the insulation layer created by the first etch process.

8. The method of claim 7, wherein the sacrificial material is a metal selected from the group consisting of Cu, Ru, and NiFe.

9. The method of claim 7, wherein the sacrificial material is a metal oxide selected from the group consisting of $SiO_2$ and $TaO_2$.

10. The method of claim 7, wherein the second photomask is formed over at least a portion of the sacrificial material.

11. The method of claim 1 further comprising lapping the pole material deposited in the pole tip region.

12. A method of forming a write pole for a magnetic recording head, the method comprising:
    providing a wafer comprising an insulation layer;
    forming a first photomask over a portion of the insulation layer;
    forming a first trench in the insulation layer via the first photomask;
    depositing a sacrificial material in the first trench;
    planarizing the sacrificial material;
    forming a second photomask over a portion of the insulation layer and a portion of the planarized sacrificial material;
    forming a second trench in the insulation layer via the second photomask; and
    depositing a pole material across the wafer, whereby the first and second trenches are filled with the pole material to form the write pole,
    wherein a transition region of the write pole where a yoke region and a pole tip region are adjoined has a radius of curvature less than about 0.2 micrometers.

13. The method of claim 12, wherein the sacrificial material is selected from the group consisting of $SiO_2$, Cu, and NiFe.

14. The method of claim 12, wherein the planarizing comprises a chemical mechanical planarization (CMP).

15. The method of claim 12 further comprising performing a wet etching process to remove at least a portion of the sacrificial material in the first trench.

* * * * *